June 20, 1961 J. A. BOMBARDIER 2,989,097
TREE DELIMBING JAWS
Filed July 26, 1960 2 Sheets-Sheet 1
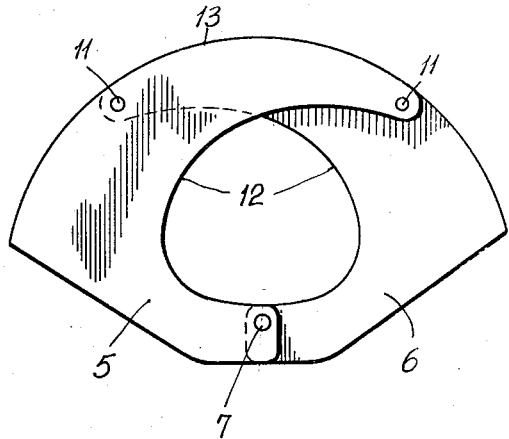
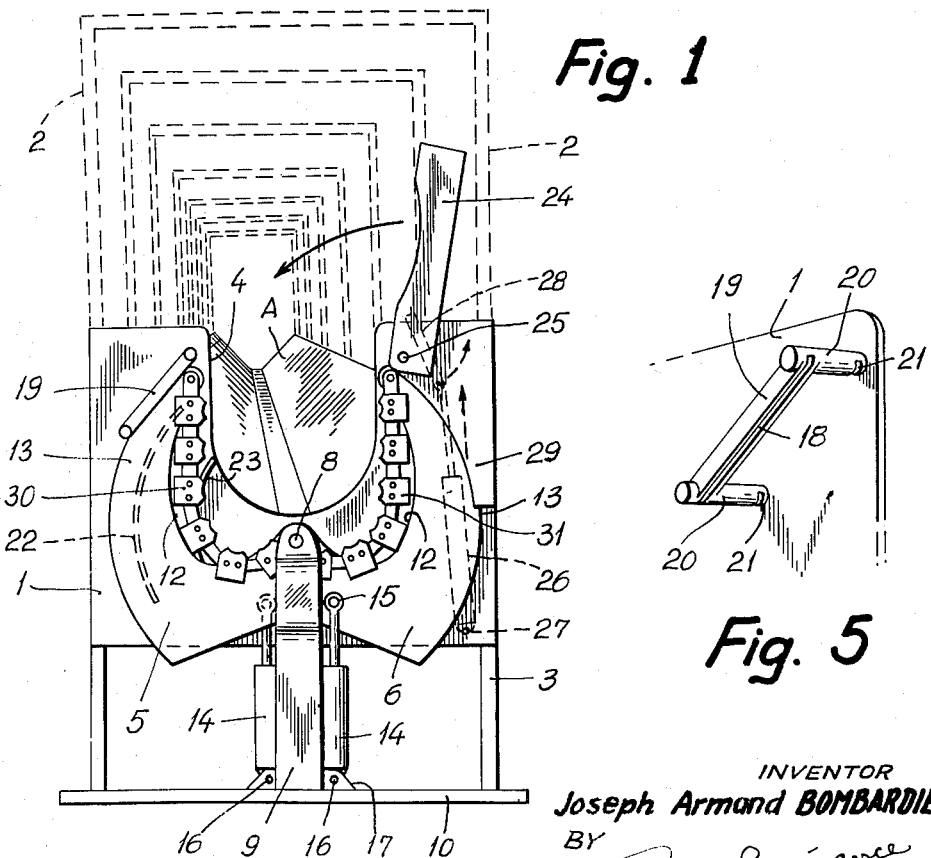
INVENTOR
Joseph Armand BOMBARDIER
BY Pierre Lespérance
PATENT AGENT June 20, 1961     J. A. BOMBARDIER     2,989,097
TREE DELIMBING JAWS Filed July 26, 1960     2 Sheets-Sheet 2

INVENTOR
Joseph Armand BOMBARDIER
BY Pierre Lespérance
PATENT AGENT

United States Patent Office 2,989,097
Patented June 20, 1961

2,989,097
TREE DELIMBING JAWS
Joseph Armand Bombardier, Valcourt, Quebec, Canada
Filed July 26, 1960, Ser. No. 45,375
7 Claims. (Cl. 144—208)

The present invention relates to apparatus for delimbing trees and more particularly to a system of jaws provided with cutters and between which a tree is pulled for delimbing said tree by the cutters. The entire apparatus for delimbing trees is described in co-pending patent application Serial No. 56,404, filed September 16, 1960 by the same applicant.

The actual practice for delimbing felled trees in the forest is still mainly a manual operation. Once the trees are felled, they are delimbed by means of an axe or a mechanical saw or other instrument handled by one or two men. This delimbing operation requires considerable time and is expensive. The machine having the delimbing jaws of the present invention enables delimbing of trees in a fast and efficient manner. The jaws in accordance with the invention are adapted to encircle the tree trunk while the tree is pulled through the aperture defined by said jaws whereby the cutters carried by the latter cut the branches and the tree trunk is completely delimbed and even debarked, if desired. It is to be noted that the delimbing operation, especially of big trees requires a considerable pulling force and consequently, the jaws must have a construction such that they will resist the forces to which they are subjected.

The general object of the present invention resides therefore in the provision of delimbing jaws in a delimbing machine which have such a construction that they can resist considerable forces.

Yet another object of the present invention resides in the provision of jaws of the character described which are so constructed that their cutters can encircle and come in cutting contact with the entire periphery of the tree trunk despite variations in the cross sectional area of said tree trunk and of irregularities of its surface.

Yet another object of the present invention resides in the provision of delimbing jaws of the character described which can delimb and debark different sizes of trees.

The foregoing and other important objects of the present invention will become more apparent during the following disclosure and by referring to the drawings, in which:

FIGURE 1 is a front elevation of the tree delimbing jaws of the invention, and showing also, in perspective view, the relative position of the machine to which the jaws are mounted;

FIGURE 2 is a front elevation of the plates or jaws on which the cutters are mounted, shown in partially folded position;

FIGURE 5 is a partial perspective view of a detail;

Figure 4:
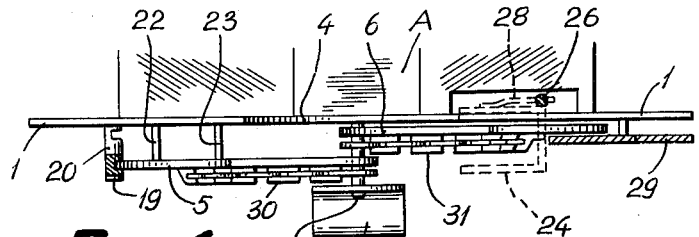
FIGURE 4 is a top plan view of the jaw assembly and part of the trough of the machine.
Figure 6:
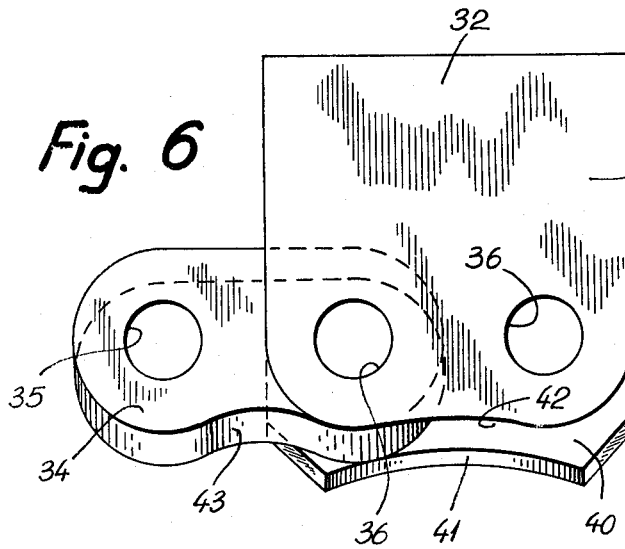
FIGURE 6 is an enlarged view of two links of the belt forming the cutters.
Figure 7:
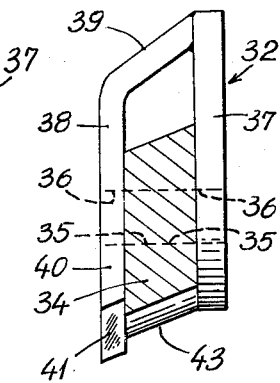
FIGURE 7 is a side elevation of a cutter with a cross section of its connecting link.
Figure 3:
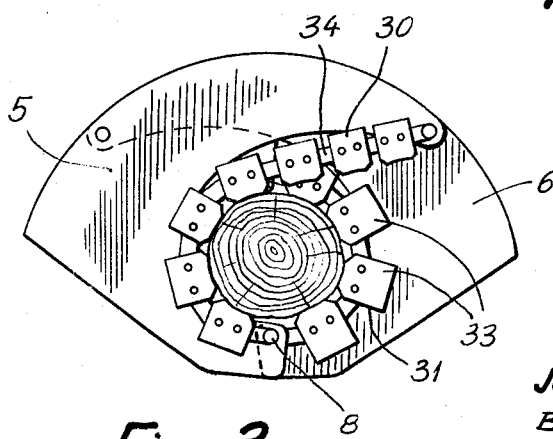
FIGURE 3 is an elevation of the jaws and cutters surrounding a tree trunk in operative position.

Referring now more particularly to the drawings in which like reference characters indicate like elements throughout, in accordance with the invention, trees are felled in the forest by sawing them close to the roots and are brought without further manipulation to the machine for delimbing trees where the base end of the tree trunk is inserted in the opening defined between the two jaws and the tree is pulled by a cable through said opening while forcibly closing the jaws over the tree to encircle the same whereby the branches are cut and the tree with its branches removed is pulled along a trough disposed downstream from the jaws.

Referring to FIGURE 1, it is seen that the jaw assembly is mounted on the front face of a vertical plate 1 which is rigidly secured to the front end of a horizontally disposed trough A extending downstream from plate 1 and adapted to receive the delimbed tree which is pulled through the jaw assembly by means of a cable arrangement (not shown) which is supported by framework 2 extending above the trough A. The present invention is more particularly concerned with the jaw assembly mounted on plate 1, the remaining part of the apparatus being described in the above noted co-pending patent application by the same inventor.

Plate 1 has supporting legs 3 and has at its top edge a deep notch 4 registering with the trough A.

A pair of overlapping plate like jaw members 5 and 6 have registering holes 7 for pivotal connection on a pivot pin 8 secured to plate 1 at the center thereof and just below notch 4, pin 8 being also supported by brace 9 extending in front of the jaw assembly and secured at its lower end to the base member 10 interconnecting legs 3.

Each jaw 5, 6 has the general form of a U with the hole 7 at one end of its shorter leg and having its longer leg tapering towards its free end which is provided with a hole 11. The two jaws are arranged opposite one another to define inner curved edges 12 while each jaw has an outer circular edge 13 concentric with pivot hole 7.

The jaws 5, 6 are actuated for pivotal movement about pin 8 towards and away from each other under action of hydraulic cylinder and piston units 14. The piston rods of units 14 are pivotally connected to the respective jaws at 15 and their cylinders are pivotally mounted at 16 to ears 17 secured to transverse base 10, the cylinder and piston units 14 extending on each side of central brace 9. The left jaw 5 is guided in its pivotal movement by having its circular outer edge 13 slidably inserted in the groove 18 of a guide bar 19 which is secured by pins 20 to the support plate 1. The pins 20 are grooved at 21 adjacent support plate 1 for slidably receiving and guiding the outer circular edge portion 13 of the right hand jaw 6 when the latter moves in closed position. The left hand jaw 5 is also in sliding contact with the outer edge of curved flanges 22 and 23 secured to and projecting forwardly of support plate 1.

An inverted channel shaped member 24 is pivoted at 25 to the right hand side of support plate 1 and is adapted to take a horizontal position closing the top of the notch 4 under action of hydraulic cylinder and piston unit 26 which is positioned behind plate 1 and is pivoted at 27 to the lower edge of said plate 1 while its piston rod is pivotally connected to arm 28 rigid with member 24. The groove defined by member 25 receives and guides in the closed position of said member 24, the outer circular edge portion 13 of the right hand jaw 6 during pivotal movement of the latter. The right hand jaw 6 is in direct sliding contact with support plate 1 and furthermore the front face of its outer marginal portion slidably engages a guiding plate 29 spacedly secured to support plate 1 in the upper part of its right hand portion.

A flexible belt of cutters 30 and 31 are associated with each jaw 5, 6. Each belt 30 and 31 consists of a plurality of cutters 32 and 33 respectively pivotally interconnected by links 34 by means of pins passing through holes 35 made in the links and holes 36 made in the cutters. The outer links 34 of each belt are directly pivotally connected by pins secured within the holes 11 of the jaws at the outer ends of the jaws and pivoted on the main pivot pin 8 for the two jaws. The left hand side cutters 32 are constituted by a flat sole 37 in direct sliding contact with its associated left jaw 5, and by a top plate 38 which has a bent part 39 directly welded to the sole 37 and a cutter part 40 which is spaced and parallel to sole 37 for receiving therebetween the link 34. The inner edge portion of the cutter part 40 is bevelled to form a cutting edge 41 and this cutting edge is longitudinally convex. The cutting edge 41 protrudes inwardly from the inner slightly convex edge 42 of sole 37. The pair of holes 36 are made through the cutter part 40 and through the sole 37. The inner edge 43 of the links 34 is also convex and transversely bevelled to merge with inner edges 41 and 42. The radius of curvature of the inner edges of links 34 and cutters 32 and 33 is chosen to have a value corresponding to the mean value of the radius of the tree trunks adapted to be delimbed by the device of the invention.

Figure 8:
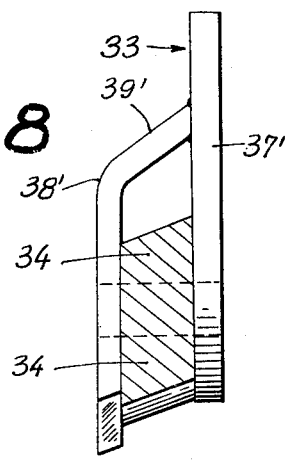
FIGURE 8 is a view similar to that of FIGURE 7 but corresponding to the cutter of FIGURE 6 for one side of the jaw assembly.

The links 34 for the right hand belt 31 are identical to those of the left hand belt 30 and the cutters 33 shown in FIGURE 8 have also an identical construction, except that the sole 37' has a greater width and extends outwardly from the junction of the bent part 39' of the top 38'. The inner edge face 43 of the links 34 are in both cases transversely inclined so as to be substantially level with the inner edges 42 of sole 37 and with the cutting edge 41 of the cutter part 40.

As previously mentioned, the belts 30 and 31 are in sliding contact with the front face of their associated jaws 5 and 6 respectively. The length of each belt is selected in such a way that it is shorter than the developed length of the curved inner edge 12 of each jaw between holes 7 and 11, such that the cutting edges 41 will protrude with respect to said inner edges 12 inwardly within the opening defined by the overlapping jaws 5 and 6. However, the length of the belt is sufficient such that at least the greater number of cutters will have their sole directly resting against jaws 5 and 6 in all the pivoted positions of said jaws.

Referring to FIGURE 4, it will be seen that the right hand jaw 6 is in direct sliding contact and bears against the support plate 1 and its associated right belt 31 is in direct contact with a front face of jaw 6 while left jaw 5 is adapted to slide and bears against the top 38' of the cutters 33 of the right belt 31 and that the left belt 30 has its soles 37 in direct bearing and sliding contact with the front face of the left jaw 5.

In the use of the delimbing device, the big end of the tree trunk is attached to a pulling cable and made to enter notch 4 of support plate 1. The hydraulic cylinder and piston units 14 and 26 are then operated to thereby close the jaws 5 and 6 so that they will overlap and completely encircle the tree trunk with the cutters of the belts 30 and 31 directly engaging said tree trunk over its entire perimeter. The guide member 24 will also pivot about its pivot 25 into close position across the notch 4. The tree is then pulled across the belts of cutters which delimb the tree and also, if desired and if sufficient hydraulic pressure is fed to cylinders 14 completely debark the tree. During the delimbing and debarking operation, the jaws 5 and 6 and the belts 30 and 31 are well supported by members 1, 19, 22, 23, 24 against the considerable downstream pressure exerted thereon. These jaws 5 and 6 and their belts of cutters are also positively maintained in position by members 19, 24 and 29 against possible upstream pressure which might be produced if the tree is pulled again upstream for a repeat delimbing and debarking operation for instance in the case where the bark is particularly difficult to remove and it is desired to remove the same entirely.

It will be noted that while the tree is being pulled through the jaws, constant hydraulic pressure is applied to the cylinders 14 and 26 such that the jaws are constantly urged into closed position. The branches are cut and fall in front of the jaws and the flexible belt of cutters constantly completely surround and are in cutting contact with the periphery of the tree despite variations in its contour and despite continuous variations of its diameter. When big branches have to be cut, the cutters can move outwardly of the tree to cut said branches with a minimum of effort.

While a preferred embodiment in accordance with the present invention has been illustrated and described, it is understood that various modifications may be resorted to without departing from the spirit and scope of the appended claims.

What I claim is:

1. In an apparatus for delimbing trees, a pair of pivotally mounted and overlapping plate-like jaw members having opposite curved inner edges, power means for pivoting said jaw members towards and away from each other about their pivot point for completely embracing a tree trunk moving through the aperture defined by said inner edges of the overlapping jaws, a flexible belt of cutters associated with each jaw and pivotally attached at two spaced points of said jaw adjacent the inner edge thereof, the length of each belt being shorter than the developed length of the inner edge of the associated jaw between the pivotal connections of said belt to said jaw, such that said cutters protrude inwardly from said inner edge, the length of each belt being such that the majority of the cutters of said belt bear directly against the associated jaw when a tree is moved through the embracing cutters and opening defined by the overlapping jaws.

2. In an apparatus as claimed in claim 1, wherein said belt of cutters includes cutter members having concave cutting edges to contact the periphery of a tree trunk.

3. In an apparatus as claimed in claim 1, wherein each belt consists of a series of cutter members interconnected by links, each cutter member having a U-shaped cross section, one leg of which defines a sole in direct sliding contact with the associated plate like jaw member, and the other leg of which defines a top, said link being inserted between the two legs of the cutter member, the top having the cutting edge and protruding inwardly beyond the inner edge of the sole and the inner edge of the link being transversely inclined and coinciding with said cutting edge and with the inner edge of the sole.

4. In an apparatus for delimbing trees, a vertical support plate having an upwardly opening notch, a pivot pin secured to said support plate below the center of said notch, two jaw members pivotally mounted in overlapping position on said pin, hydraulic power means for pivoting said jaws towards and away from each other, said jaws having a concave inner edge defining, when said jaws are in closed overlapping position, an opening through which a tree is adapted to be pulled, a flexible belt associated with each jaw, each belt being pivotally connected to said pivot pin at one end and to the outer end of the associated jaw at the other end, each belt consisting of cutter members and interconnecting links, each belt being shorter than the length of the developed inner edge of the associated jaw between the two pivotal points of the belt to the jaw, each cutter member having a sole in sliding contact with the inner marginal portion of the associated jaw, and a flat front portion defining an inwardly protruding cutting edge, one jaw being in bearing and sliding contact with the top portion of the cutter members of the belt associated with the other jaw.

5. In an apparatus as claimed in claim 4, wherein the length of each belt is such that the majority of its cutter members bear directly against the inner marginal portion of its associated jaw when a tree is displaced through the embracing cutters and opening defined by the overlapping jaws.

6. In an apparatus as claimed in claim 4, wherein the outer edge of each jaw has a circular portion concentric with said pivot pin and guiding means mounted on said support plate and engaging the outer marginal portion of each jaw and overlapping the front face of said jaws.

7. In an apparatus as claimed in claim 6, wherein said guiding means include a guiding member of inverted channel shaped cross section pivotally mounted at one end on said support plate and power means to pivot said guiding member into a position extending across the top portion of said notch, said guiding member slidably receiving the outer circular marginal portions of said jaw members in the closed position thereof.

References Cited in the file of this patent

UNITED STATES PATENTS

| | | |
|---|---|---|
| 2,575,422 | Laulainen | Nov. 20, 1951 |
| 2,760,534 | Hansel | Aug. 28, 1956 |
| 2,836,887 | Wheeler | June 3, 1958 |